J. E. McWORTER.
FLYING MACHINE.
APPLICATION FILED JULY 18, 1921.
1,438,929.
Patented Dec. 12, 1922.
2 SHEETS—SHEET 1.
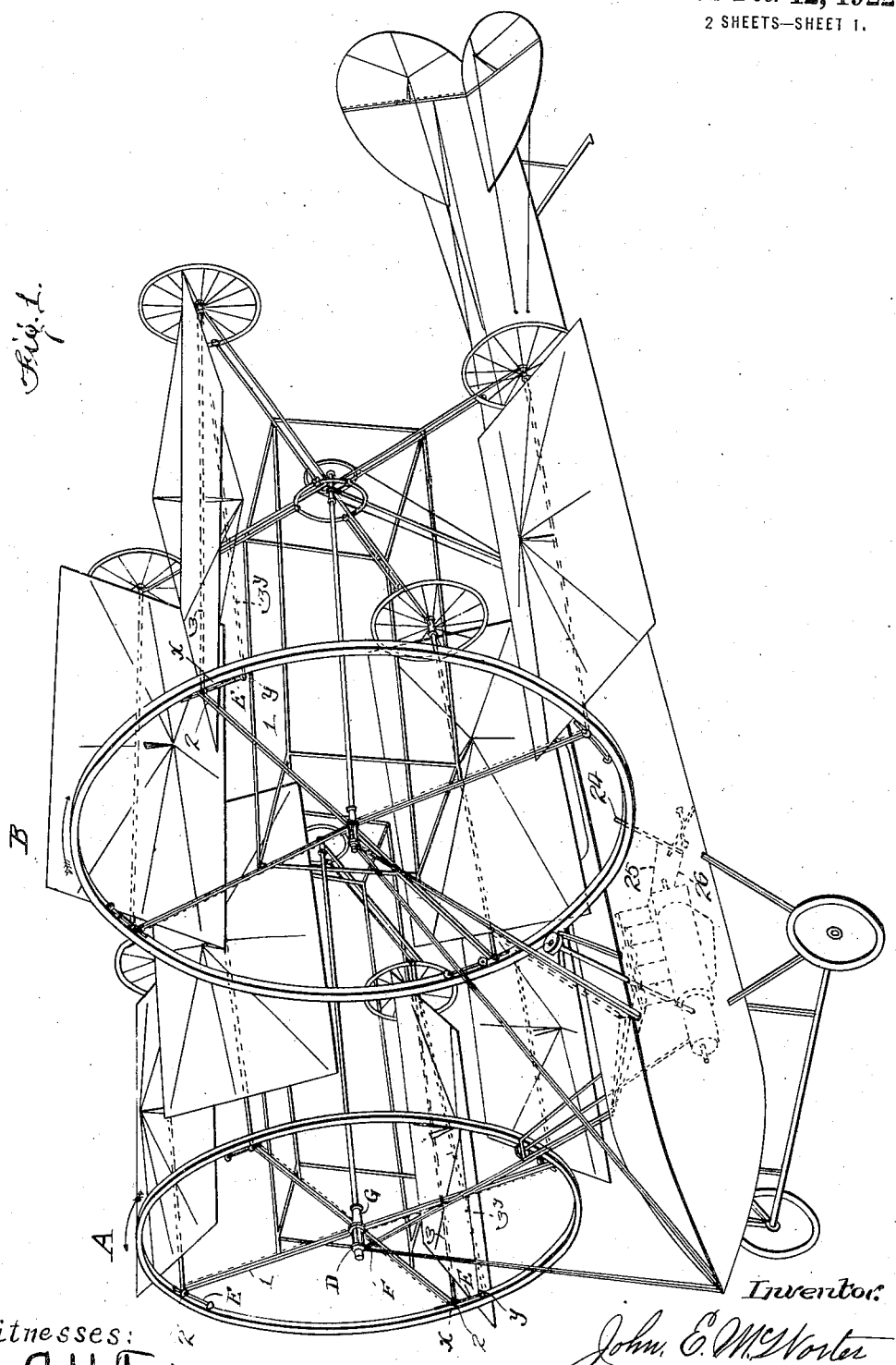
Witnesses:
C. H. Turner.
Inventor:
John E. McWorter

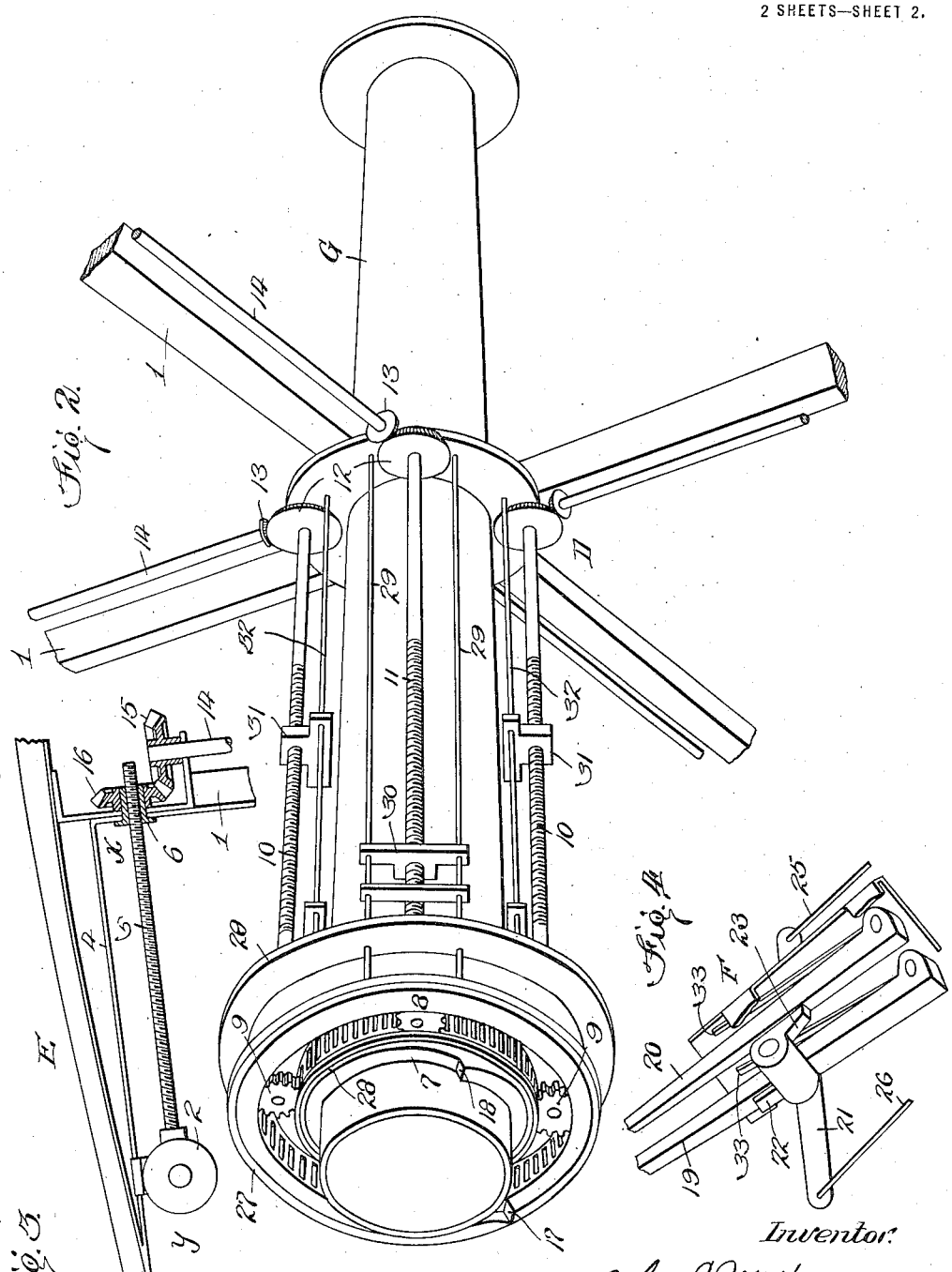

Patented Dec. 12, 1922.

1,438,929

UNITED STATES PATENT OFFICE.

JOHN E. McWORTER, OF ST. LOUIS, MISSOURI, ASSIGNOR TO AUTOPLANE COMPANY OF AMERICA, OF ST. LOUIS, MISSOURI.

FLYING MACHINE.

Application filed July 18, 1921. Serial No. 485,760.

*To all whom it may concern:*

Be it known that I, JOHN E. McWORTER, a citizen of the United States, residing at 4531 Garfield Ave., in the city of St. Louis and State of Missouri, have invented a new and useful Improvement in Flying Machines, of which the following is a specification.

My invention relates to improvements in flying machines having rotating wings or propellers of the feathering blade type.

Briefly described, my invention consists of a mechanism designed to give to the propellers of this general type of flying machine a variable horizontal component of air resistance in the direction of flight.

One object of my invention is to so adjust the relative position of the propeller blade shaft with respect to the central propeller shaft that its operation will not only sustain the machine in the air but will also propel it forwardly without having to depend wholly upon the forward tilt of the machine.

Another object of my invention is to provide an adjustable means for increasing or decreasing the relative forward pull of the propellers.

Another object of my invention is to provide a means which will enable the operator to make a running start on the ground when necessary or desirable.

Another object of my invention is to provide a means by which a greater or less speed of flight may be given the machine without changing its relative position with respect to its line of flight.

Other objects and desirable features of my invention will be hereinafter pointed out.

Similar numbers and letters refer to similar parts throughout the several views.

Figure I. of the drawings represents a preferred form of an airplane of the rotating-wing feathering-blade type with the principal parts of the improvement hereinafter described located at D, E, and F respectively;

Figure II. represents that part of the improvement located on the hub G of the propellers A and B of the machine;

Figure III. represents the parts located at the front end of each propeller blade; and Figure IV. represents a pair of ratchet bars which are designed to cooperate with that part of the improvement located on the hub of the propellers.

As illustrated in the drawings my improvement consists of a mechanism comprising a bearing at the front end of each propeller blade-shaft 3. Said bearing 2 is slidably mounted as upon bar 4, and is suitably arranged to be adjusted to different positions upon said bar by means of screw 5 and nut 6, as shown in Fig. III. Adjusting nut 6 is turned in one direction or the other as desired by means of two annular concentric rims 7 and 8 suitably mounted on the propeller hub as shown in Fig. II. The smaller of the two rims is provided with gear teeth in or on its outer face and the larger with gear teeth in or on its inner face, and the two are cooperatively connected with adjusting nut 6, preferably by means of spur gears 9 located between inner and outer rims 7 and 8, shafts 10 and 11, bevel gears 12 and 13, shafts 14, and bevel gears 15 and 16. Rims 7 and 8 are provided with a suitable number of ratchet teeth so that one or the other may be held from rotation with the propeller by means of the ratchet device F shown in Fig. IV. of the drawings. The ratchet bars 19 and 20 are brought in contact with the ratchet teeth 17 and 18 of their respective annular rims by means of lever 21 and the two lugs 22 and 23 rigidly connected therewith. The lever 21 is connected with a suitable controlling device in the body of the machine, as for example lever 24, by means of double flexible wire lines 25 and 26, one line of each running to one propeller ratchet means and one of each to the other. When the operator pushes forward on lever 24 the ratchet bar 19, for example, is brought in contact with the ratchet teeth 17 of rim 8 and holds it from rotation. This causes adjusting nut 6 to turn in that direction that will force blade bearings 2 forward in the direction of rotation as nuts 6 and their respective screws are suitably threaded either right or left as the case may require for each of the propellers. When the operator pulls back on lever 24 the opposite movement of blade bearings 2 is accomplished. Ring 27 mounted on rods 29 is provided to disengage ratchet bar 19 when bearing 2 has reached the Y position. This is accomplished by means of nuts and bars 30. Shafts 11 being suitably threaded either right or left as the case may require for the two propellers. Ring 28, similarly mounted on rods 32, is provided to disengage ratchet bar 20, when the X position of blade bearing 2 has been fully reached, by means of nuts and bars 31. When shaft 10 requires a left hand screw thread shaft 11 of the same propeller requires a right hand thread and vice versa for the other propeller. Any intermediate position may be given bearing 2 by releasing lever 24 when that point has been reached, ratchet bar springs 33 being provided to disengage the bars when not held in cooperative contact.

This improvement provides a means by which a propulsive component of air resistance may be obtained with the same economy of motive power as that obtained as a lift component in a flying machine of the feathering blade type. The economy of motive force referred to is obtained not only by the practical use of a very large area of propeller blade surface but also from the manner and direction in which these surfaces are propelled against the air. It will be noted that they move against the air at approximately right angles to the relative air-stream in which the machine is flying so that the greater the speed of flight the greater the resistance offered to propeller rotation. The required speed of propeller rotation, therefore, decreases as the speed of flight increases.

The action of each individual blade tending to compress the air during the first part of its stroke and later permitting its gradual expansion results in giving a very efficient air reaction in each case, far greater in proportion to the amount of motive force employed than it is possible to obtain by means of the screw form of propeller as now used in combination with rigid wings moving against the air at a constant angle.

As the propellers turn, one over to the right and the other over to the left, centrifugal force throws the air outward from the center of each propeller so that in forward flight the air crosses each blade diagonally from both the front and inner edges, and as the speed of rotation of the outer edge of each blade is greater than that of the inner edge an accelerated spiral movement of the air is produced giving a continuous and very effective air reaction throughout the whole time of its passage across the face of or within the influence of the propeller blades. All of the above factors, and more, which make for economy of motive force are utilized to give, not only the lift or sustaining propulsive action, but by means of the improvement herein described produces in combination therewith a very efficient and easily controlled forward propulsive action as well.

It is to be understood as a matter of detail in the construction of this machine that the position of the blade shafts 3, as shown in Fig. I. may be considered as parallel to their respective central propeller shafts, and that the dotted lines $3^y$ approximates the advanced position of the forward ends of the propeller blades.

If a horizontal component of thrust is desired opposite to the direction of flight a machine may be so constructed that the X position of the front blade bearings will be slightly in the rear, with respect to the direction of rotation, of the actual parallel position of the blade shafts, making it possible for the operator at any time to give the propellers either a retarding or forward propulsive action of variable degree. Fig. I. may be considered as representing such a machine. A machine may also be constructed with the front blade bearing permanently in the advanced Y position, giving the machine a permanent forward propulsive component of propeller action. The action of the propellers of this machine in their operation very closely approximates that of the bird wing, than which, for economy of motive force in dynamic flight, no superior or equal mechanical device is it considered possible to create.

A general description of a machine of this type is given in the drawings and specification of my U. S. Patent No. 1,115,710; and means for combined manual and automatic lateral control is covered in my U. S. Patent No. 1,114,167; but what I now claim as new and for which I apply for Letters Patent is:

1. In a flying machine having as sustaining and propelling means propellers of the feathering-blade type turning on shafts parallel to the longitudinal axis of the machine, said blades feathering by continuous rotation on shafts approximately parallel to the central shaft, means to advance or retard, in the direction of propeller rotation, one end of each blade shaft so as to give the propellers or wings of the machine a greater or less degree of propulsive or retarding component of propeller action in the direction of flight.

2. In an air-plane propeller having blades turning on shafts approximately parallel to a central shaft, means to rotate said blades bodily around the central shaft, and means to advance the front end of the blade shaft in the direction of rotation so that the propeller will have a combined propulsive and sustaining action.

3. In a propeller having blades feathered by continuous rotation on shafts approximately parallel to the central propeller shaft, means to advance or retard one end of each blade shaft with respect to the other end so that the propeller may be given a greater or less component of propeller action in a general direction parallel to the central or main propeller shaft.

4. In a flying-machine having rotary propellers of the feathering-blade type substantially as described, a slidably mounted bearing at one end of each blade, adjustable in the direction of propeller rotation or in the reverse direction by means of a screw threaded member and nut adapted to increase, decrease or reverse the propulsive component of the propeller action.

5. In a flying-machine having rotary wings of the feathering-blade type substantially as described, means to increase or decrease the propulsive component of the action of the propellers comprising a slidably mounted bearing at one end of each blade, a screw threaded member the nut of which rotates in a fixed position and adapted to advance the blade bearing forward in the direction of rotation or withdraw it to any desired position, means to turn said adjusting nuts in one direction or the other comprising two concentric annular rims located on each propeller hub and cooperatively connected with said adjusting nuts by means of spur gears between the outer and inner annular rims and suitable shafts and bevel gears, and manually controlled ratchet means adapted to hold from rotation with the propeller one or the other of said annular rims thereby adjusting the blade bearings to the desired position.

JOHN E. McWORTER.